United States Patent

Pyun et al.

[11] Patent Number: 5,563,008
[45] Date of Patent: Oct. 8, 1996

[54] FORMATION METHOD OF NICKEL ELECTRODE FOR SECONDARY ALKALINE BATTERIES

[75] Inventors: Young-bum Pyun, Seoul; Bok-hwan Jung, Kwachun, both of Rep. of Korea; Leonid B. Raikhelson, St. Petersburg, Russian Federation

[73] Assignee: Samsung Electronics Co., Ltd., Suwon, Rep. of Korea

[21] Appl. No.: 506,482

[22] Filed: Jul. 25, 1995

[30] Foreign Application Priority Data

Jul. 26, 1994 [KR] Rep. of Korea ............... 94-18139

[51] Int. Cl.⁶ ....................................... H01M 4/32
[52] U.S. Cl. ..................... 429/223; 429/206; 429/229
[58] Field of Search ......................... 429/206, 223, 429/229

[56] References Cited

U.S. PATENT DOCUMENTS

| | | | |
|---|---|---|---|
| 3,976,502 | 8/1976 | Sekido et al. | 429/223 |
| 4,037,033 | 7/1977 | Takamura et al. | 429/223 |
| 4,113,921 | 9/1978 | Goldstein et al. | 429/223 |
| 4,154,908 | 5/1979 | Menard | 429/223 |
| 4,327,157 | 4/1982 | Himy et al. | 429/229 |
| 4,339,512 | 7/1982 | Witherspoon et al. | 429/229 |
| 5,143,799 | 9/1992 | Tsenter | 429/206 |
| 5,302,475 | 4/1994 | Adler et al. | 429/223 |
| 5,405,714 | 4/1995 | Terasaka et al. | 429/223 |
| 5,453,336 | 9/1995 | Adler et al. | 429/223 |

FOREIGN PATENT DOCUMENTS

| | | | |
|---|---|---|---|
| 1149453 | 7/1983 | Canada | 429/223 |
| 8400642 | 2/1984 | WIPO | 429/223 |

*Primary Examiner*—Hoa Van Le
*Attorney, Agent, or Firm*—Burns, Doane, Swecker & Mathis, L.L.P.

[57] ABSTRACT

A formation method of nickel electrode for secondary alkaline batteries which comprises charging nickel electrodes, discharging the nickel electrodes to an amount equal to their full capacity, overdischarging the nickel electrodes under the same conditions with the previous discharging step, assembling a cell with the nickel electrodes and zinc anodes and alternating the cell between charging and discharging. Property deviations among the obtained battery articles are much reduced, so that batteries can be manufactured with uniform properties. The overdischarge of the nickel electrodes ahead of the cell assembling prevents the separator from being oxidized by gas generation. Further, the charging step subsequent to assembling the cell with the overdischarged nickel electrodes and the zinc electrodes forms metal zinc components, which act as an extra capacity for the zinc electrodes, so that each battery can always secure a constant extra capacity for the zinc electrode, contributing to uniformity of properties.

3 Claims, No Drawings

FORMATION METHOD OF NICKEL ELECTRODE FOR SECONDARY ALKALINE BATTERIES

BACKGROUND OF THE INVENTION

1. Field of the Invention

The present invention relates, in general, to a method for forming the sintered nickel electrodes which are used as cathodes in secondary alkaline batteries and, more particularly, to an improvement in property deviations among the nickel electrodes and in uniform battery properties as a result of the method.

2. Description of the Prior Art

Conventionally, nickel electrodes, which are used as cathodes in secondary alkaline batteries such as Ni-Cd batteries, Ni-Zn batteries, Ni-Fe batteries and Ni-MH batteries, are formed by immersing a porous nickel-sintered electrode plate in a nickel nitrate solution to form nickel hydroxide active materials within the nickel electrode plate, followed by the activation of the nickel hydroxide materials through formation processes comprising charging and discharging operations.

A conventional formation method is disclosed in U.S.S.R. Pat. No. 300,915, which relates to Ni-Zn batteries. In the U.S.S.R. patent, it is suggested that a nickel electrode and a zinc electrode are inserted in a cell, then having them be in the same discharged state by completely discharging them at the same time and, finally, charged them in such a way that the capacity of the zinc electrode may be larger than that of the nickel electrode.

As taught in the above-cited U.S.S.R. patent, a uniform electrode state through complete discharge could be accomplished and uniform battery properties and significant improvements in high rate discharge and low temperature properties could be effected. However, the formation method of the above-cited patent is disadvantageous in that a cellulose film, acting as a separator, is injured by oxidation attributable to the oxygen gas generated upon complete discharge of the zinc anode.

Another formation method of nickel electrode for alkaline secondary battery was suggested by M. A. Dasoyan in VYSHAYA SHKOLA p 387, 1970, in which nickel electrodes are discharged at an amount as large as the capacity thereof, followed by assembling the cell with the nickel electrodes and zinc electrodes and, finally by charging and discharging the cell. This formation method is preventive of the damage of a separator attributed to the gas generation in an electrode plate.

However, this conventional formation method is problematic in several aspects, as follows. A plurality of nickel electrode plates connected in parallel are treated to form nickel cathodes. Because there are differences in the amount of the active material among the nickel electrodes, the discharge states in each nickel electrodes become different after discharging up to an amount equal to the theoretical capacity of nickel electrodes. Thus, batteries employing such nickel electrodes do not have uniform properties. In particular, since extra capacity cannot be formed in the zinc electrode, a zinc powder should be separately added to the zinc electrode to secure the extra capacity. In addition, the formed extra capacity of the zinc electrode becomes nonuniform owing to the nonuniform properties of the nickel electrode. In result, if these batteries are applied in electric vehicles, the collective batteries cannot utilize enough battery properties as the operating state of each battery varies.

SUMMARY OF THE INVENTION

Accordingly, it is a principal object of the present invention to overcome the above-mentioned problems encountered in the prior art and to provide a formation method of nickel electrode for secondary alkaline battery, which results in an improvement in property deviations among the nickel electrodes and in uniform battery properties.

Based on the intensive and thorough research by the present inventors, the above object could be accomplished by providing a formation method of nickel electrode for secondary alkaline batteries, comprising the steps of: charging nickel electrodes prior to assembling into a cell; discharging the nickel electrodes to an extent of their full capacity; overdischarging the nickel electrodes under the same conditions with the previous discharging step; assembling a cell with the overdischarged nickel electrodes in combination with zinc electrodes; and charging and discharging the cell.

This object as well as other advantages and embodiments will become apparent from the detailed description of the invention.

DETAILED DESCRIPTION OF THE INVENTION

In accordance with the present invention, nickel cathodes are formed by a characteristic formation method which comprises charging nickel electrodes, discharging the nickel electrodes to a point equal to their full capacity, overdischarging the nickel electrodes under the same conditions with the previous discharging step, assembling a cell with the nickel electrodes and zinc anodes and alternating the cell between charging and discharging.

According to the present method, as the nickel electrodes are discharged over the theoretical capacity of nickel cathode, all of them are maintained at the same discharged state and thus, a uniformly charged state is possible. By virtue of the uniformly charged state, property deviations among the batteries can be controlled upon assembling the batteries, thereby obtaining uniform battery properties. In addition, since only the nickel electrodes are overdischarged, damage to the separator caused by oxygen generation can be prevented.

In the meanwhile, because the overdischarged nickel electrodes along with zinc electrodes are assembled into a cell and then, subjected to charging, as much as the overcharging amount of the nickel electrodes cannot be used for charging the active material of the nickel electrodes. In contrast, the zinc electrodes continue to be charged, so that, at the zinc electrode, metal zinc materials are formed as charge products, that remain in spite of continuously successive charging and discharging, acting as an extra capacity of the zinc anodes. Particularly, the extra capacity of the zinc anodes can be constantly maintained with respect to the nickel cathodes, allowing the batteries to have uniform properties. In addition, the amount of the metal zinc powder, which is added as an extra capacity of the zinc anodes, is reduced so that property degradation such as nonuniform current density of the zinc anodes attributable to a nonuniform distribution of the metal component may be prevented.

To effect the present invention, the overdischarged nickel cathodes and the zinc anodes are assembled in a cell which should be subsequently capped ahead of the discharging and charging operation of the cell. Otherwise the oxygen gas generated from the nickel electrodes upon charging the batteries might drain out. In this case, metal zinc component is formed to an amount equal that of the drained oxygen gas at the zinc electrode, leading to difficulty in controlling the extra capacity of the zinc electrodes.

As for the overdischarging of the nickel cathodes, an amount as much as 6 to 30% of the zinc electrode capacity is discharged at a current ranging from 0.02 to 0.2 of the nickel electrode capacity. If the discharge current and the discharge amount are below 0.02 and 6%, respectively, the overdischarging of the nickel electrode is insufficient and thus, the effects of the present invention cannot be brought about. On the other hand, if the discharge current and the discharge amount are above 0.2 and 30%, respectively, the overdischarging is too overdone to prevent the nickel electrodes from being injured by hydrogen generated rapidly.

EXAMPLE I

A nickel—zinc battery was prepared in the following manner. First, zinc electrodes were made whose composition comprised a base of zinc oxide and 5 weight percent of metal zinc and which had a capacity of 35 Ah per electrode plate. After a impregnation step was undertaken in which porous nickel sintered plates were immersed in a nickel nitrate solution to generate nickel hydroxide active materials within the nickel plate, a formation step was carried out in a KOH aqueous solution with a specific density of 1.1, taking as many as 20 nickel-impregnated electrode plates as 1 block.

After being charged for 15 hrs at 0.7 A per nickel electrode plate, the nickel electrodes were discharged at 0.7 A until it had a potential of 0.2 V with respect to mercury oxide reference electrode such that 7 Ah, the capacity of nickel electrode, was completely discharged. In succession, the nickel electrodes were subjected to overdischarging for 7.5 hrs. at 0.14 A (corresponding to 0.02 of the nickel capacity) per nickel electrode plate. At that time, the overdischarge amounted to 0.14 A×7.5 h=1.05 Ah. Because 2 nickel electrodes constituted one set upon cell assembling, the total discharge capacity was 2×1.05=2.1 Ah, amounting to 6% of the capacity of the zinc electrode.

Such overdischarged nickel electrodes and the zinc electrodes both were inserted in a cell which was, then, covered with a battery cap equipped with a valve endurable to 1 atmosphere. After assembling the battery, it was charged with a current of 0.1 A for 15 hrs, followed by discharging with a current 0.2 A to 1.2 V of battery voltage. This was repeated three times for completion of the formation process. The overdischarge amount was measured and the battery was disassembled to analyze the components of the zinc electrodes, with the aim of measuring the content of metal zinc contained in the zinc electrodes. The results are given as shown in Table 1 below.

EXAMPLE II

A nickel—zinc battery was prepared in a similar manner to that of Example I, except that the nickel electrodes were overdischarged at 0.7 A (corresponding to 0.1 of the nickel electrode capacity) for 4 hrs so that the overdischarge amount might reach 16% of the zinc electrode capacity. At that moment, the overdischarge amount was measured and the battery was disassembled to analyze the components of the zinc electrodes, with the aim of measuring the content of metal zinc contained in the zinc electrodes. The results are given as shown in Table 1 below.

EXAMPLE III

A nickel-zinc battery was prepared in a similar manner to that of Example I, except that the nickel electrodes were overdischarged at 1.4 A (corresponding to 0.2 of the nickel electrode capacity) for 3.6 hrs so that the overdischarge amount might reach 30% of the zinc electrode capacity. At the moment, the overdischarge amount was measured and the battery was disassembled to analyze the components of the zinc electrodes, with the aim of measuring the content of metal zinc contained in the zinc electrodes. The results are given as shown in Table 1 below.

COMPARATIVE EXAMPLE I

A nickel—zinc battery was prepared in a similar manner to that of Example I, except that the nickel electrodes were overdischarged at a current corresponding to a current ratio of 0.01 of the nickel electrode capacity so that the overdischarge amount might reach 3% of the zinc electrode capacity. At that moment, the overdischarge amount was measured and the battery was disassembled to analyze the components of the zinc electrodes, with the aim of measuring the content of metal zinc contained in the zinc electrodes. The results are given as shown in Table 1 below.

COMPARATIVE EXAMPLE II

A nickel- zinc battery was prepared in a similar manner to that of Example I, except that the nickel electrodes were overdischarged at a current corresponding to a current ratio of 0.3 of the nickel electrode capacity so that the overdischarge amount might reach 50% of the zinc electrode capacity. At that moment, the overdischarge amount was measured and the battery was disassembled to analyze the components of the zinc electrodes, with the aim of measuring the content of metal zinc contained in the zinc electrodes. The results are given as shown in Table 1 below.

COMPARATIVE EXAMPLE III

A nickel—zinc battery was prepared in a similar manner to that of Example I, except that the nickel electrodes were not overdischarged. At that moment, the battery was disassembled to analyze the components of the zinc electrodes, with the aim of measuring the content of metal zinc contained in the zinc electrodes. The results are given as shown in Table 1 below.

TABLE 1

| Exam. No. | Overdischarge Current Ratio | Overdischarge Amount | Deviation of Battery Capa. | Increased Metal Zinc |
|---|---|---|---|---|
| I | 0.02 | 6.0% | 5% | 3.0% |
| II | 0.1 | 16.0% | 4.5% | 3.0% |
| III | 0.2 | 30.0% | 4.0% | 3.7% |
| C.I | 0.01 | 3.0% | 9.5% | 1.0% |
| C.II | 0.3 | 50.0% | damaged* | — |
| C.III | — | — | 10.0% | — |

Note:
*electrodes were damaged.

As apparent from Table 1, a deviation of battery capacity of the nickel cathodes formed according to the method of the present invention are almost twice as narrow as those formed in the Comparative Examples. The nickel cathode of Comparative Example 2 went so far as to be damaged. In addition, the content of metal zinc contained in the zinc electrodes is further increased in the Examples than in the Comparative Examples.

As described hereinbefore, the formation method of nickel electrode for secondary alkaline battery according to the present invention comprises the overdischarging of the nickel electrodes enough to maintain the discharged states thereof constant irrespective of the deviation of their active materials. Accordingly, property deviations among battery articles are much reduced, so that the batteries can be manufactured with uniform properties. In addition, since the overdischarge of the nickel electrodes is performed ahead of the cell assembling, the separator can be prevented from being oxidized by gas generation. Further, the charging step subsequent to assembling the cell with the overdischarged nickel electrodes and the zinc electrodes forms metal zinc components, which act as an extra capacity for the zinc electrodes, so that each battery can always secure a constant extra capacity for the zinc electrode, contributing to uniformity of properties. Also, the resulting extra capacity significantly reduces the amount of the metal zinc powder which is added separately to the zinc electrodes, preventing non-uniform current density within the zinc electrodes and improving battery properties.

Other features, advantages and embodiments of the present invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A formation method of nickel electrode for secondary alkaline batteries, comprising the steps of:

charging nickel electrodes prior to assembling the nickel electrodes into a cell;

discharging the nickel electrodes to an extent of their full capacity;

overdischarging the nickel electrodes under the same conditions as the previous discharging step;

assembling a cell with the overdischarged nickel electrodes in combination with zinc electrodes; and charging and discharging the cell.

2. A formation method in accordance with claim 1, wherein the overdischarging of the nickel electrodes is carried out at a current corresponding to a range of 0.02 to 0.2 overdischarge current ratio of the theoretical capacity of nickel electrode and to an extent that the overdischarge amount is on the order of 6 to 30% of zinc electrode capacity.

3. A formation method in accordance with claim 1, further comprising the steps of inserting the overdischarged nickel electrodes and zinc electrodes in a cell and capping the cell, prior to the charging and discharging step.

* * * * *